United States Patent [19]

Satoh et al.

[11] Patent Number: 5,059,268
[45] Date of Patent: Oct. 22, 1991

[54] METHOD FOR APPLYING TIRE MATERIAL

[75] Inventors: Kazuo Satoh, Kobe; Tsutomu Nosaka, Kako, both of Japan

[73] Assignee: Sumitomo Rubber Industries, Ltd., Hyogo, Japan

[21] Appl. No.: 364,569

[22] Filed: Jun. 6, 1989

Related U.S. Application Data

[60] Continuation of Ser. No. 140,753, Jan. 4, 1988, abandoned, which is a division of Ser. No. 829,542, Feb. 10, 1986, Pat. No. 4,738,743, which is a continuation of Ser. No. 413,062, Aug. 30, 1982, abandoned.

[30] Foreign Application Priority Data

Aug. 31, 1981 [JP] Japan ............... 56-136432
Aug. 31, 1981 [JP] Japan ............... 56-136433

[51] Int. Cl.⁵ ............. B29D 30/08; B29D 30/00; B65C 9/04
[52] U.S. Cl. ............... 156/130.3; 156/123; 156/130; 156/184; 156/405.1; 156/458
[58] Field of Search ............. 156/64, 96, 122, 123, 156/128.1, 128.6, 130, 130.3, 130.7, 133, 134, 157, 184, 522, 405.1, 406.4, 406.6, 412, 446, 457, 458, 468, 497, 909; 226/168, 180, 190, 191; 242/56 R, 74

[56] References Cited

U.S. PATENT DOCUMENTS

| | | | |
|---|---|---|---|
| 2,002,970 | 5/1935 | Willshaw et al. | 156/405.1 |
| 2,276,494 | 10/1939 | Kellogg | 226/191 |
| 2,346,439 | 4/1944 | Leguillon | 156/405.1 |
| 2,588,207 | 3/1952 | Cleland et al. | |
| 3,057,397 | 10/1962 | Riddle et al. | 156/405.1 |
| 3,071,179 | 1/1963 | Tourtellotte et al. | |
| 3,152,945 | 10/1964 | Jackson | 156/522 |
| 3,393,112 | 7/1968 | Brown | 156/123 |
| 3,479,238 | 11/1969 | Kehoe et al. | 156/406.4 |
| 3,607,556 | 9/1971 | Appleby et al. | 156/406.4 |
| 3,728,181 | 4/1973 | Simmons, Jr. | 156/130 |
| 3,904,471 | 9/1975 | Kubinski | 156/405.1 |
| 4,009,072 | 2/1977 | Schultz et al. | 156/406 |
| 4,359,675 | 11/1982 | Miller | 425/29 |
| 4,448,627 | 5/1984 | Satoh et al. | 156/405.1 |

FOREIGN PATENT DOCUMENTS

| | | |
|---|---|---|
| 0025134 | 3/1981 | European Pat. Off. |
| 2240045 | 9/1976 | Fed. Rep. of Germany |
| 34-10935 | 3/1957 | Japan |
| 56-6856 | 2/1981 | Japan |
| 57-105336 | 6/1982 | Japan |
| 1136176 | 12/1968 | United Kingdom |
| 1183431 | 3/1970 | United Kingdom |
| 1381935 | 1/1975 | United Kingdom |
| 2017018 | 10/1979 | United Kingdom |

Primary Examiner—Michael W. Ball
Assistant Examiner—Gregory J. Wilber
Attorney, Agent, or Firm—Birch, Stewart, Kolasch & Birch

[57] ABSTRACT

A method for applying a tire material such as carcass ply to a building drum in a tire building process wherein the cut leading end of the ply is caused to pressure-adhere onto the building drum by a leading-end applying and pressure-adhering roller. The building drum is caused to rotate at an angle less than one rotation, and thereafter the ply is cut by the cutter mechanism, and the building drum is further rotated to join the cut trailing end of the ply with the cut leading end, while the roller is pressure-adhering the cut trailing end of the ply against the building drum.

2 Claims, 6 Drawing Sheets

METHOD FOR APPLYING TIRE MATERIAL

This application is a continuation of application Ser. No. 140,753 filed on Jan. 4, 1988, now abandoned, which is a divisional of application Ser. No. 829,542 filed on Feb. 10, 1986, now U.S. Pat. No. 4,738,743, which is a continuation of application Ser. No. 413,062 filed on Aug. 30, 1982, now abandoned.

The present invention relates to improvements in an apparatus for applying a tire material such as carcass ply including bias cord ply and radial cord ply in a tire building process.

Conventionally in the tire building process, a long ply was cut off in advance to the length of one drum circumferential portion on a conveyor fixedly disposed adjacent to the tire building drum. Thereafter, the cut ply was carried onto the side of the drum by the conveyor to which speed the peripheral speed of the building drum was synchronized. The ply was applied against the drum while being depressed by the trailing-end depressing roller. However, since the ply was cut off in advance by one drum-circumferential portion, the material of the ply was shrunk while it remained in place for some time, thus varying the ply size. A complicated synchronizing apparatus was required to cause the feed conveyor speed to conform to the building drum peripheral speed. Also, since the stock length corresponding to one drum-circumferential portion was required for the stock of the ply cut to major, the stock facility such as the conveyor was required to be correspondingly larger in size. Particularly, when the overlap joint amount of the ply was small as in the radial tire, variation in the ply size was caused due to the shrinking or winding of the material, especially in the case of the textile cord ply, because the ply was left behind for some time until it was applied on the drum after the major cutting operation of the ply or was caused due to the improper synchronous operation of the building drum peripheral-speed with respect to the conveyor. Proper and optional joint amount was always difficult to be provided. Furthermore, in the above-described conventional system, the cut end portion was applied on the knife cradle or the ply cord was disarranged was crawled meanderingly or was folded in end, in passing the knife cradle. Accordingly, it is extremely difficult to provide the positive automation of the tire building operation.

Accordingly, an essential object of the present invention is to provide an apparatus for applying a tire material such as a carcass ply in a tire building process which can eliminate the disadvantages in the conventional apparatus of the type referred to above, and which can have a correct joint of the ply, with the operation for the joint of the ply being completely independent of the way it is wound, shrinking or the like of the ply.

Another object of the present invention is to provide an apparatus for a tire material in a tire building process by which the positive automation of applying a ply to a building drum can be easily realized.

A further object of the present invention is to provide an apparatus for applying a tire material in a tire building process of the above described type which is simple in construction and stable in its function at high reliability, and can be readily manufactured at low cost.

In accomplishing these and other objects, according to a first preferred embodiment of the present invention, the apparatus for applying a tire material comprises a leading-end applying roller disposed in front of a ply feeding table, the leading-end applying roller being adapted to cause the ply leading end to pressure-adhere onto the building drum with a ply engagement means being provided on its surface during the advancing operation of the table, the ply feeding table being disposed for free longitudinal motion with respect to the tire building drum. A drum rotational angle controlling mechanism is provided for controlling the rotational angle of the drum to establish a measured-cutting position of the ply to be applied to the drum. A tearing mechanism is utilized for cutting off, to measure, the ply applied on approximately one drum-circumference portion, and a pressure-adhering roller is disposed under the table, the pressure-adhering roller being utilized for applying a major portion of the ply of one drum circumference portion to the drum during the advancing operation through a driving mechanism and/or for causing the trailing end of the cut ply to be pressure-adhered onto the drum surface.

A second embodiment of the present invention relates to an apparatus for applying a tire material such as bias code ply to a drum which comprises an adsorption box which adsorbs and retains the leading end of the ply placed on a table to adsorb and release the leading end thereof onto the building drum. A leading end applying and pressure-adhering roller are provided to cause the leading end of the ply, fed onto the drum by the adsorption box, to pressure-adhere onto the building drum, with the bias code ply engagement means provided on its surface, and succeeding plies are pressure-adhered onto the rolling drum. A drum rotational angle controlling mechanism is utilized for controlling the rotational angle of the drum. A cutter mechanism is utilized for cutting off, to measure, the ply which has almost completed the applying operation of one drum-circumferential portion. A table is disposed beneath the ply for facilitating free longitudinal motion to feed the ply to the tire building drum. A third embodiment of the present invention relates to an apparatus suitable for the ply wherein the above leading-end applying and pressure-adhering roller of the first embodiment is composed of a leading-end applying roller and a depressing roller is provided to depress the major portion of the ply to apply it onto the drum and/or to depress the trailing end of the ply to apply it onto the drum.

These and other objects, features, aspects, and advantages of the present invention will become more apparent from the following detailed description of the present invention when taken in conjunction with the accompanying drawings, in which;

A first embodiment of the present invention will be described hereinafter with reference to FIG. 1 through FIG. 4.

Figure 1:
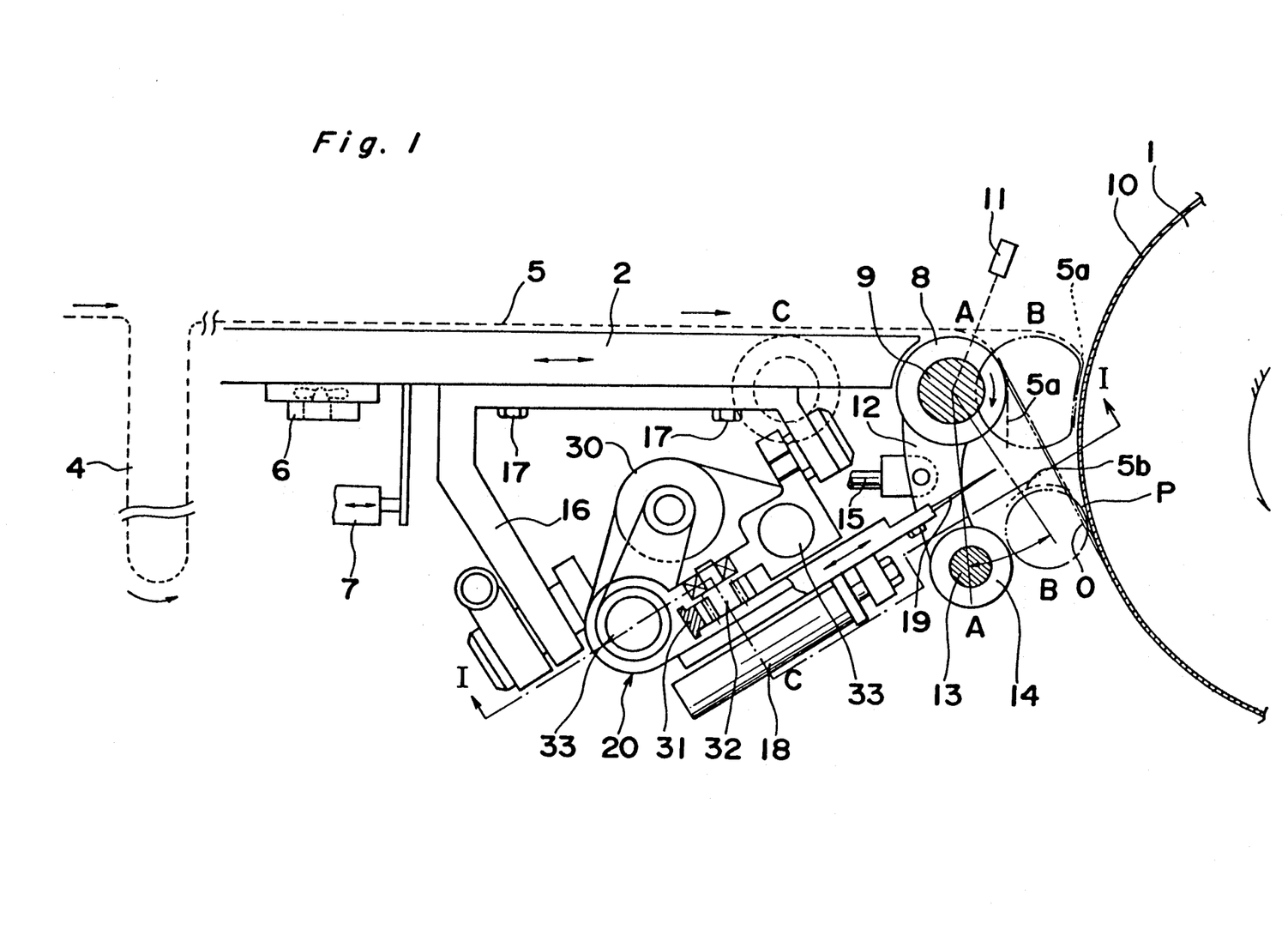
FIG. 1 is a side view of a ply applying apparatus in a first embodiment of the present invention.

Generally, as shown in FIG. 1, a ply applying apparatus is installed adjacent to a tire building drum 1. The ply applying apparatus is provided with a ply feed table 2, which is located at a right angle to the axial direction of the drum 1 so that the long ply 5 may be fed onto the table 2 through a festoon portion 4 from a ply winding roll (not shown) disposed behind the table 2.

The table 2 is composed of an air floating table of known construction, wherein the air is jetted from a blower 6 to float the ply over the table. The fed ply 5 is always floated to reduce the frictional resistance during the conveying operation. Since the frictional resistance of the fed ply 5 is reduced at the table 2, the self-weight of the festoon portion 4 of the ply 5, the length of which being longer than one circumference portion of the drum 1, works as a back tension on the ply 5 being fed to the molding drum. Thus, the back tension thereof prevents the ply 5 from becoming creased, during the application of the ply 5 upon the building drum 1, thereby providing a positive adhering operation, which insures the proper application of the ply to the drum 1. A photoelectric detector (not shown), which is adapted to detect the slackened amount of the ply 5 to retain it at a given amount, is provided on the festoon portion 4 of the ply 5.

The table 2 is longitudinally moved by a table cylinder 7 so that the table 2 may move towards and away from the tire building drum 1. The table cylinder is composed of a small stroke portion, which causes the table front portion, including a roller for applying the leading end of the ply to the drum 1 as a pressure-adhering roller 8, to longitudinally move between a position A and a position B, and a main stroke portion, which causes the pressure-adhering roller 8 to longitudinally move between the position A and a position C.

The applying roller 8 which is made of a sponge material of large diameter, with the top peripheral edge thereof being aligned to the top face of the table 2, is rotatably supported by a shaft 9 in front of the table 2. The applying roller 8 advances together with the table 2 to pressure-adhere the leading ply end of the ply 5a of the building drum 1 with an inner liner 10 having been already applied thereon.

It is desirable that the ply leading end 5a should hang down by itself as low as the level of at least the lower peripheral edge of the applying roller 8 in front of the drum a. The applying roller 8 may be made of rubber, instead of a sponge material. The applying roller can be made of any material which will become flexible when it comes into contact against the drum surface 1. Also, since the applying roller 8 has a built-in one-way clutch, it is adapted to perform a free rotating operation only in the clockwise direction, as shown in FIG. 1. Since the applying roller 8 is made of a sponge material, the ply leading end 5a is adapted to come into adhering engagement with the applying roller 8 by its resilient surface.

The applying roller 8 is deformed when it is depressed against the drum 1 which prevents the ply leading end 5a from becoming creased, coupled with the back tension caused by the festoon portion 4, so that the ply leading end 5a is caused to adhere against the inner liner 10 of the drum 1 to ensure the proper application of the ply. When the inner liner 10 is not used, for example, a tacky tape as an engagement means may be applied in advance against the drum 1 or a proper number of vacuum ports may be provided in the surface of the drum 1 for applying a suction to the ply.

An electromagnetic brake 11, which is provided in the shaft 9 of the applying roller 8, is adapted to apply its brake upon the applying roller 8 at a given timing to render the roller non-rotatable in accordance with the operation of a control device (not shown).

Also, there is provided a small-diameter pressure-adhering roller 14, which is made of sponge, rubber or the like, which also has a one-way clutch built therein, and is supported, by a shaft 13 of an arm 12 supported through the shaft 9 of the applying roller 8, on the under side of the table 2. A cylinder 15 is coupled to the arm 12, and the pressure-adhering roller 14 is longitudinally moved through the oscillation of the arm 12 caused by the operation of the cylinder 15 to come into pressure-adhering contact with the drum to insure against separation of the ply from the building drum 1. During the advancing operation of the pressure-adhering roller 14, the major portion of the ply 5 with a length corresponding to that of one circumference of the building drum 1 is applied on the inner liner 10 of the building drum 1, and/or the trailing end 5b of the ply, cut off by a cutting-off mechanism 20 to be described later, is pressure-adhered thereon.

Figure 3:
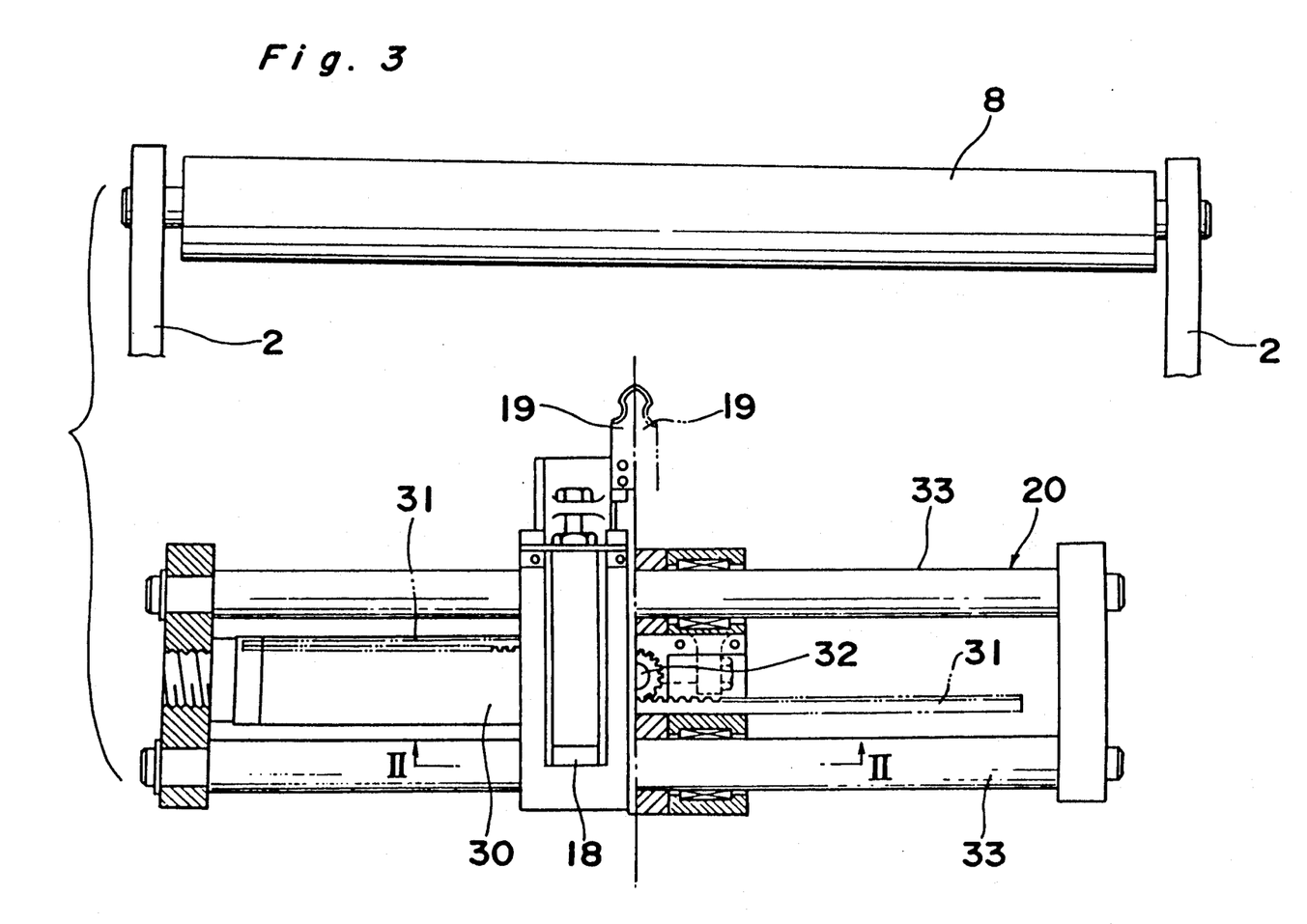
FIG. 3 is a view taken along a line I—I of FIG. 1.
Figure 4:
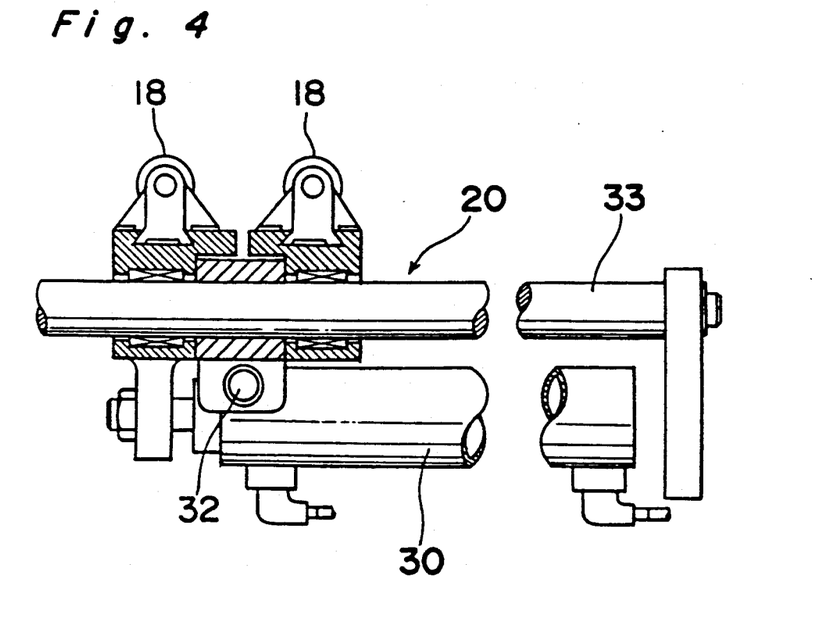
FIG. 4 is a cross-sectional view taken along a line II—II of FIG. 3.

The under side of the table 2 provided with a known cutting-off mechanism 20 as disclosed in Japanese Patent Publication No. 5947/1954, wherein a bracket 16 is secured on the table 2 by bolts 17, and a pair of right, left sharp cutting knives 19, 19, which are caused to appear and disappear by the movement of cylinders 18, 18, are provided on the bracket 16 in association with a laterally moving mechanism which causes the knives 19, 19 to move in the width direction from the center of the ply 5 along a guide rod 33 through right, left synchronous racks 31 and a pinion 32 by the advancing, and retreating motions of a cylinder 30 as shown in FIGS. 3 and 4.

When the applying operation of the ply of a length corresponding to one circumferential portion of the drum 1 by a motor 36, the drum 1 stops its rotation, and the cutting-off mechanism 20 thrusts the pair of back to back cutting-off knives 19, 19 into the central portion of the ply 5 extending from the direction line O to the direction line P between the applying roller 8 located in a retreat position A and the pressure-adhering roller 14 located in an advance position B, the applying roller 8 being prevented from rotating at this time due to the brake being applied thereon. Then, the cutting-off mechanism 20 is adapted to move the pair of knives 19, 19 sideways and externally along the width direction, respectively, thereby cutting off the ply 5. It is to be noted that the knives 19, 19 may be heated beforehand to make the cutting easy.

Figure 2A:
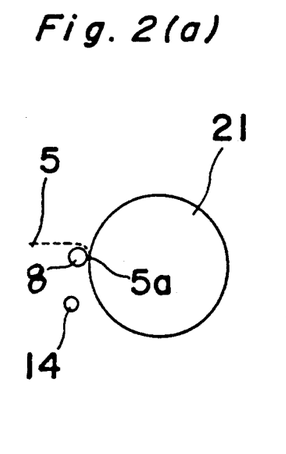
FIGS. 2(a), 2(b) and 2(c) are side views each showing analyzed ply applying processes.
Figure 2B:
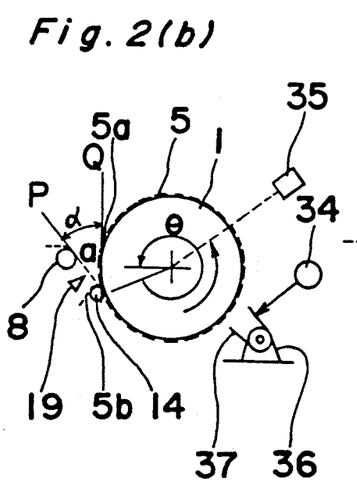

In FIG. 2, a drum rotation angle controlling mechanism 34 is adapted to count the pulse signals to be generated in connection with the rotation angle of the drum 1, rotating in counterclockwise direction, by a pulse counter 35 built-in in the drum 1. The mechanism 34 is programmed to stop the motor 36, when the pulse counter 35 has counted the pulse equivalent to a desired rotation angle 0° such as 300° of the drum 1, to stop the drum 1 precisely at the desired rotation angle through a timing belt 37 provided between the drum 1 and motor 36. As shown in FIG. 2(b), the length of the ply 5 disposed from the leading end 5a of the ply 5 to a measured cutting position becomes equal to the length, which is the optional overlap joint length of the ply 5 added to one circumference portion of the drum 1.

Thus, the controlling operation of the rotation angle of the drum 1 provides the desired amount of the overlap joint of the ply 5.

Referring to FIG. 2(b), the angle α of the ply 5 extended to the direction line of P between the roller 8 and the roller 14 with respect to the tangential line of Q at the measured cutting position on the drum 1 is desired to be approximately 30° or more so that the trailing end 5b of the ply 5 applied to the roller 14 after the ply 5 has been cut off, does not become wrinkled.

With the ply applying apparatus of such construction as described hereinabove, assume that the leading-end applying roller 8 and the pressure-adhering roller 14, together with the table 2, are located in the retreat position A. The long ply 5 is placed in a floating state on the table 2, and the ply leading end 5a hangs as low as the level of the lower peripheral edge of the applying roller 8 from the upper portion of the applying roller 8. Then, the table 2 advances from the position A to the position B, by the table cylinder 7, towards the building drum 1 with the inner liner 10 having been already applied thereon. As shown with dotted line in FIG. 1, the front portion of the applying roller 8 is deformed due to the contact between the drum 1 and the roller 8 so that the ply leading end 5a may be fastly adhered to the inner liner 10.

FIG. 2(a) shows the condition where the ply leading end 5a has been completely adhered to the inner liner 10 of the drum 1.

Then, after the lapse of a given time period, the leading end applying roller 8 retreats, together with the table 2, to the position A, as shown in FIG. 2(b), and the building drum 1 starts its rotation to wind the ply 5 on the inner liner 10 of the drum 1. To ensure the prevention of the ply leading end 5a from being torn off from the inner liner 10 of the drum 1, the roller 14 is moved forward to the surface of the drum 1 as soon as the roller 8 retreats, to depress the ply 5 against the drum 1.

At this time, the ply 5 is floated on the table 2, and the back tension produced by the self-weight of the ply 5 works through the festoon portion 4, so that the ply 5 does not become wrinkled when it is applied to the building drum 1, thus resulting in a positive adhering and applying operation.

The building drum 1 comes to its stop after rotating through a given rotation angle θ, whereby the length from the leading end 5a of the ply 5 to the measure cutting position becomes equal to the length of one circumference portion of the drum 1 plus the optional amount of the overlap joint. At the same time, the electromagnetic brake 11 is applied to the leading-end applying roller 8 to stop the rotation of the applying roller 8.

Thereafter, the pressure-adhering roller 14 advances by the operation of cylinder 15 to cause the ply 5 to adhere fast to the inner liner 10 on the drum 1. Thus, the direction line of the ply 5 changes from O to P and the ply 5 is extended by the small amount of tension between the rollers 8, 14, as shown in FIG. 1.

Then the pair of cutting and tearing knives 19, 19 are projected by the cylinder 18 to thrust into the central portion of the ply 5 extended as shown in FIG. 2(b) and each of the knives is laterally moved externally to the left or the right along the width direction of the ply 5 through the operation of the laterally moving cylinder 30, thereby tearing and cutting off the ply 5.

At this time, the ply 5 is extended and thus the cutting and tearing operation for the ply 5 is smoothly effected. Since the ply 5 is secured by the rollers 8, 14, the length of the ply leading end 5a and the ply trailing end 5b at the cutting operation remains unchanged. When the rollers are residing on the side of the table 2, the ply 5 hangs by its proper length from the leading-end applying roller 8 as the ply leading end 5a. Also, when the rollers are residing on the side of the building drum 1, the ply 5 is adapted to be slackened along the pressure-adhering roller 14 as the trailing end 5b. Although each of the ply ends 5a, 5b remains free from the rollers the length thereof is as short as about 30 mm, and it will not shrink by itself. Even if it shrinks, the shrinking amount is easy to understand, thus resulting in easier control of the joint amount of the ply 5.

Figure 2C:
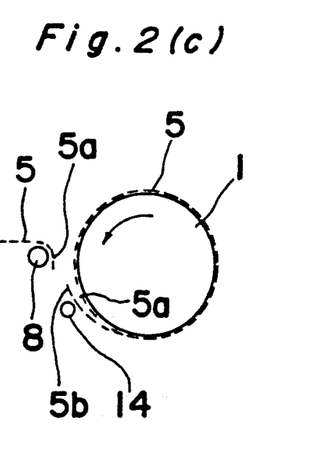

After the lapse of a given time period, the building drum 1 starts its rotation again. The ply trailing end 5b adheres under pressure against the inner liner 10 by the pressure-adhering roller 14 as shown in FIG. 2(c), and is overlappingly joined with the preceding ply leading end 5a by a proper length.

In the present embodiment, the amount of the overlap joint of the ply 5 can be provided within a range of ±2 mm by controlling the operation of the rotation angle of the building drum 1 to ensure a sufficient performance even as to the radial tire.

Also, according to the present invention, the ply leading end is pressure-adhered by the pressure-adhering roller of the ply feeding table and the drum is rotated by a desired angle to completely apply almost one-circumferential portion of a long ply. The, the ply extending between the leading-end applying roller and the pressure-adhering roller is torn and cut to measure by the tearing and cutting mechanism. Thereafter, the ply trailing end is applied to the building drum by the pressure-adhering roller to cause the ply leading end to be joined with overlapping to the trailing end by an optional amount (length). Accordingly, the ply can be properly applied independently of the rolling habit, shrinking of the ply material, and an accurate and optional amount of material used for the joint can be provided. In addition, damages to the knife cradle after the ply has been cut off, and improper feeding operations caused by the ply rolling habit or the like are eliminated. Thus, the positive automation of the ply application is simplified. Also, a stock of the one cut-ply portion on the conveyor is rendered unnecessary and also complicated mechanism required for the synchronism of the conveyor drum, or the like is not necessary, and the present invention has the effect of rendering the apparatus more compact in size.

A second embodiment of the present invention shown in FIG. 5 through FIG. 10 will be described hereinafter.

Figure 5:
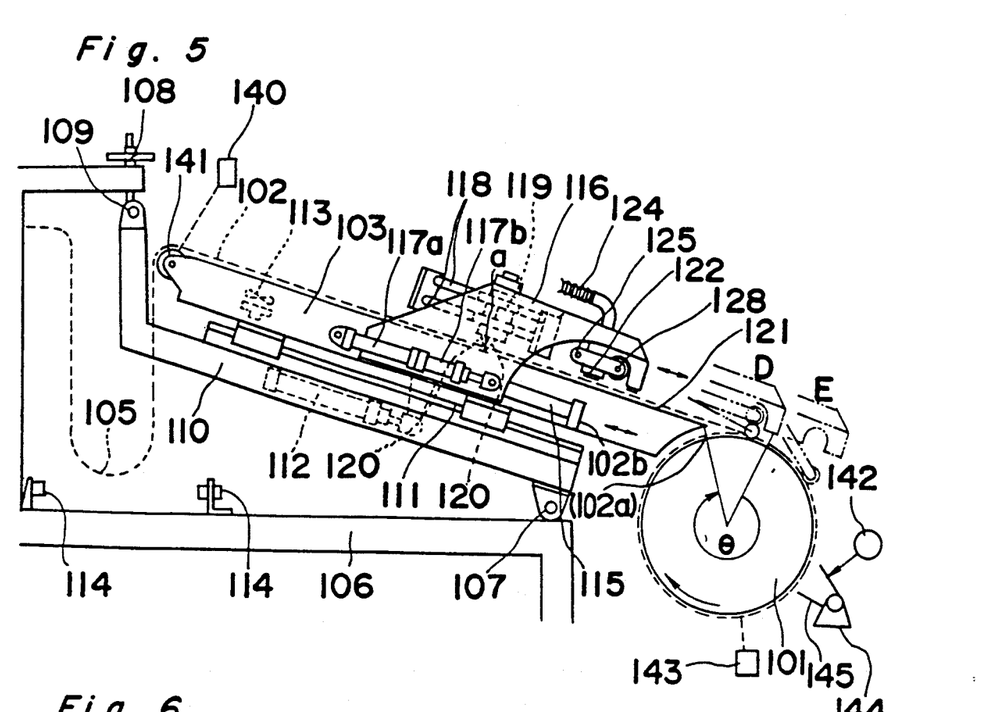
FIG. 5 is a front face view of an apparatus for applying bias code ply in a second embodiment of the present invention.
Figure 6:
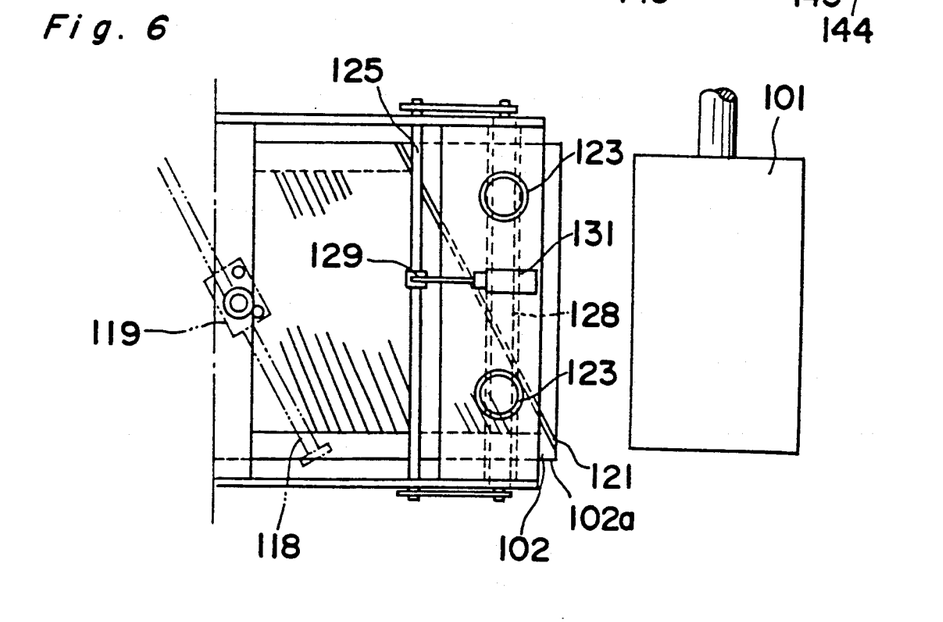
FIG. 6 is a plan view of FIG. 5.

As shown in FIG. 5 and FIG. 6, a bias cord ply applying apparatus comprises a ply feeding table 103 which can be placed in an inclined position with respect to the tire building drum 101. The ply feeding table 103 can feed the ply 102 from the tangential direction to the drum 101. The ply applying apparatus is adapted to feed the long ply 102 onto the table 103 from a ply winding roll (not shown) located behind the table 3 through a festoon portion 105 and a roller 141 containing a built-in one-way clutch 140, the roller 141 being provided at the rear end of the table 103.

The tire building drum 101 has a drum rotation angle controlling mechanism 142 and a built-in pulse counter 143 in the drum 101 for counting the pulse signals to be generated in connection with the rotation angle of the drum 101 rotating in a clockwise direction. A motor 144 for rotating the drum 101 stops when the pulse equivalent to a desired rotation angle $\theta$ of the drum 101, such as 300°, has been counted by the pulse counter 143. The driven drum 101 is programmed to stop precisely at the desired rotational angle through a timing belt 145 and a motor 144. At this time, the length of the ply 102 from the leading end 102a to the trailing end 102b to be disposed at a measure-cut position a thereof is equal to the length, which is the desired amount of the overlap joint of the ply plus one drum-circumference portion of the ply 102.

Therefore, the controlling operation of the rotation angle of the drum 101 can provide the desired amount of joint overlap of the ply 102.

The table 103 is supported for free longitudinal motion by the rail portion 111 on the obliquely arranged base 110, which is pivoted at the bottom portion by a pin 107 on a stationary frame 106 placed on the floor and is pivoted at a tip portion by a pin 109 through an angle controlling handle 108. The table 103 is coupled to the cylinder 112 mounted on the base 110 to control the longitudinal motion so that the table 103 may move towards and separate from the building drum 1 by the cylinder 112. The base 110 is obliquely disposed so that the other tire material such as tread applying apparatus may be arranged in multistage style.

The table 103 is composed of an air floating table of known construction, wherein the air is jetted from a blower 113 to float the ply 102 over the table 103. The fed ply 102 is always floated to reduce the frictional resistance against the table 103 during the feeding operation. Since the frictional resistance is reduced at the table 103, the self-weight of the ply 102, the length of which is longer than one circumference portion of the drum, of the festoon portion 105 functions as a back tension to the ply 102 to be fed toward the drum 1. Thus, it not only ensures the cutting operation of the ply 102, to be described later, but also improves adhering on the building drum 101 by preventing the ply from becoming wrinkled. A photoelectric detector 114, which is adapted to detect the amount of the slackened ply 102 to retain it at a given amount, is provided around the festoon portion 105.

A movable frame 116, which is supported for free longitudinal motion by the rail portion 115, is disposed on the table 103 and is coupled to a coupled cylinder 117 mounted on the table 103. The movable frame 116 is controlled in its longitudinal motion to move towards above and away from the building drum 101 by the coupled cylinder 117 composed of a pair of cylinders 117a and 117b each coupled to the other. The movable frame 116, which has been moved forward to the upper position D of the building drum 101 by the cylinder 117a, is adapted to be moved further forward to a depressing position D by the cylinder 117b.

A known cutter mechanism 119, as disclosed in Japanese Patent Publication No. 5,947/1954, is provided in the rear portion of the movable frame 116. The cutter mechanism 119 is guided by two guide bars 118, 118, which, in case of cutting a bias cord ply, are obliquely disposed in the width direction of the ply 102. A pair of knives 120, 120 move externally across the width direction, respectively, from the center of the ply 102 to the right, left synchronous rack, pinion by the advancing, retreating motion of the cylinder (not shown) thereby tearing the ply 102. A cutter groove 121 is provided, as shown in FIG. 6, in the front portion of the table 103 to be adapted to receive the knife 120 of the cutter mechanism 119 crossing obliquely when the movable frame 116 advances to the depressing position E.

It is needless to say that, in the case of cutting a radial cord ply, the knife 120 crosses at a right angle to or at an approximate right angle to the longitudinal direction of the ply 102.

Figure 7:
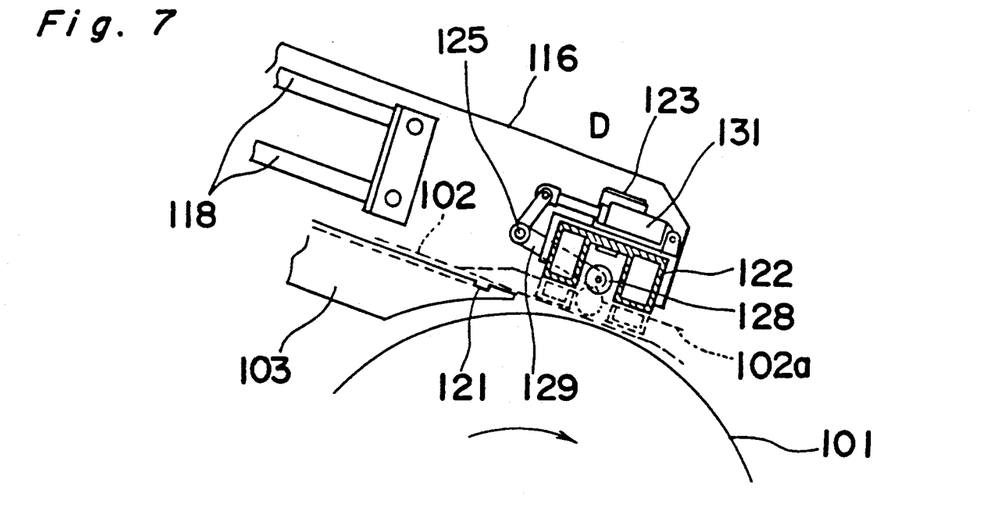
FIG. 7 is a front face view of a movable frame in an upper position.

An adsorption box 122 is provided, for free vertical motion by the cylinders 123, 123, in the front portion of the movable frame 116, as shown in FIG. 7, to be adapted to adsorb and retain the cut leading end 102a of the ply 102, in a position of the inner side of the cutter groove 119, when the movable frame 116 retreats. The adsorption box 122 is connected to a vacuum pump (not shown) through a coupling pipe 124. The ply leading end 102a to be adsorbed by the adsorption box 122 is required for joint accuracy to be absorbed for the overall portion of the ply width, as shown in FIG. 5, especially in the case of the bias cord ply 102.

A leading-end applying and pressure-adhering roller 128 is pivoted, by an arm 129, on the shaft 125 supported on the front portion of the movable frame 116, as shown in FIG. 7. The roller 128, which is located in the middle of the adsorption box 122, is made of an elastic material such as a sponge material, rubber or the like. A cylinder 131 is coupled to the arm 129, and the roller 128 is adapted to be oscillated between the pressure-adhering position and the retreating position by the cylinder 131.

With the applying apparatus of such a ply 102 of such construction, as described hereinabove, at first, the table 103, the movable frame 116 are located in the retreat position, and the building drum 101 is not rotating. The ply 102 is supplied as a floating ply above the table 103 by a blower.

The adsorption box 122 is lowered by the cylinder 123, 123 to start the vacuum operation and, after the box has adsorbed and retained the cut leading end 102a of the ply 102, it is raised by the cylinder 123.

Then, the table 103 is moved forward to a location closest to the drum 101 by the cylinder 112, and the movable frame 116, together with the table 103, are moved forward so that the adsorption box 122 may draw out the ply 102.

In the forward position of the table 103, the movable frame 116 is moved forward to the upper position D of the building drum 101 by the cylinder 117a. As shown in FIG. 7, the adsorption box 122 is lowered by the cylinder 123 to depress the cut leading end 102a of the ply 102 against the building drum 101 with a tacky tape being applied in advance as engagement means thereon. The drum 101 may have a proper number of vacuum ports provided in proper locations or an inner liner applied thereon, in addition to the tacky tape as the ply engagement means.

At the same time, the leading end applying and pressure-adhering roller 128 oscillates downwardly by the cylinder 131 to further depress the cut leading end 102a of the ply 102 against the building drum 101.

Figure 8:
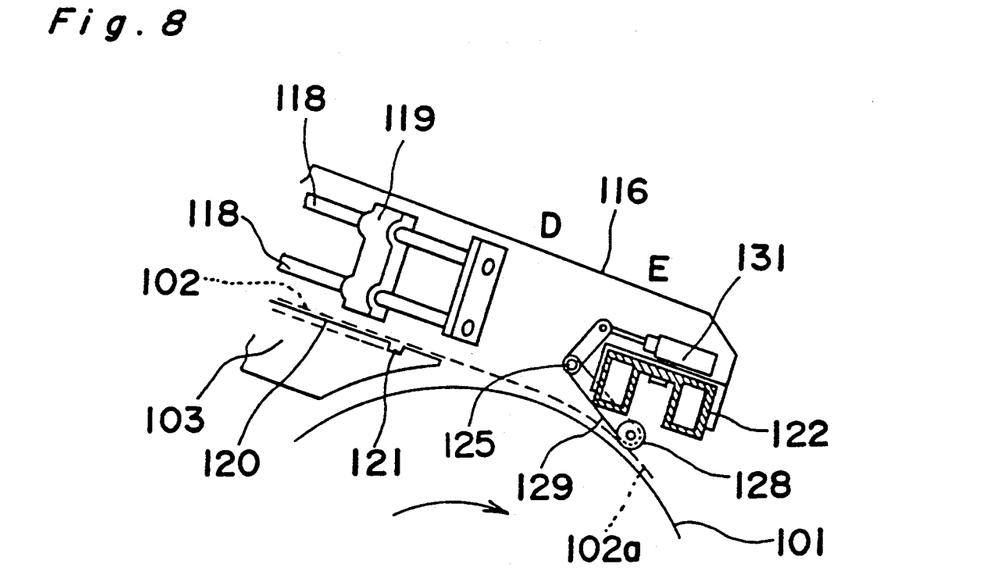
FIG. 8 is a front face view of the movable frame in a depressing position.

After the vacuuming operation has been cut off and the adsorption of the cut leading end 102a has been released, the adsorption box 122 is raised by the cylinder 123, while the roller 128 keeps depressing the ply leading end 102a. Then, as shown in FIG. 8, the movable frame 116 is moved forward to the depressing position E by the cylinder 117b, and the cut leading end (e.g. a triangle-shaped cut end in case of a bias cord ply) 102a of the ply 102 is depressed along the building drum 101 by the leading-end applying and pressure-adhering roller 128 lowered by the cylinder 123.

The building drum 101 is controlled to be rotated by a given angle θ, at which angle the length of the bias code ply 102 from the major cut position a thereof to be cut off by the cutter mechanism 119 to the leading end 102a thereof becomes equal to one drum-circumference portion thereof added to the amount of the joint overlap of the ply 102. The building drum is also controlled to stop while the ply 102 is pressure-adhered on the building drum 101 by the roller 128.

Since the ply 102 is floated on air along the surface of the table 103 at this time, the frictional resistance unnecessary for the winding operation does not work at any times, and the back tension, due to the self-weight, of the ply 102 is applied by the festoon portion 105. Thus, the adhering of the ply 102 to the building drum 101 is sufficient to prevent the ply from becoming creased, and the cutting operation for the ply can be smoothly performed by the cutter as described hereinafter.

Once the building drum 101 stops at a given angle θ, the ply 102 located on the table 103 is obliquely cut off along the ply angle by the cutter mechanism 119.

Then, the building drum 101 rotates again, the cut trailing end 102b of the ply 102 is depressed by the leading-end applying and pressure-adhering roller 128 so that the cut trailing end may be overlappingly joined with the preceding cut leading end 102a.

Thereafter, the building drum 101 stops its rotation, the table 103 and the movable frame 116 retreat, and the frame 103 retreats, thereby completing one cycle.

Figure 9:
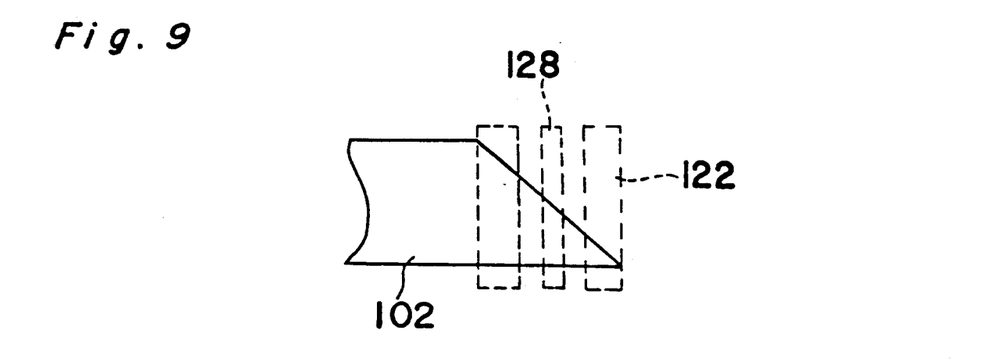
FIG. 9 is a plan view showing the relationship between the bias code ply and an adsorption box.
Figure 10:
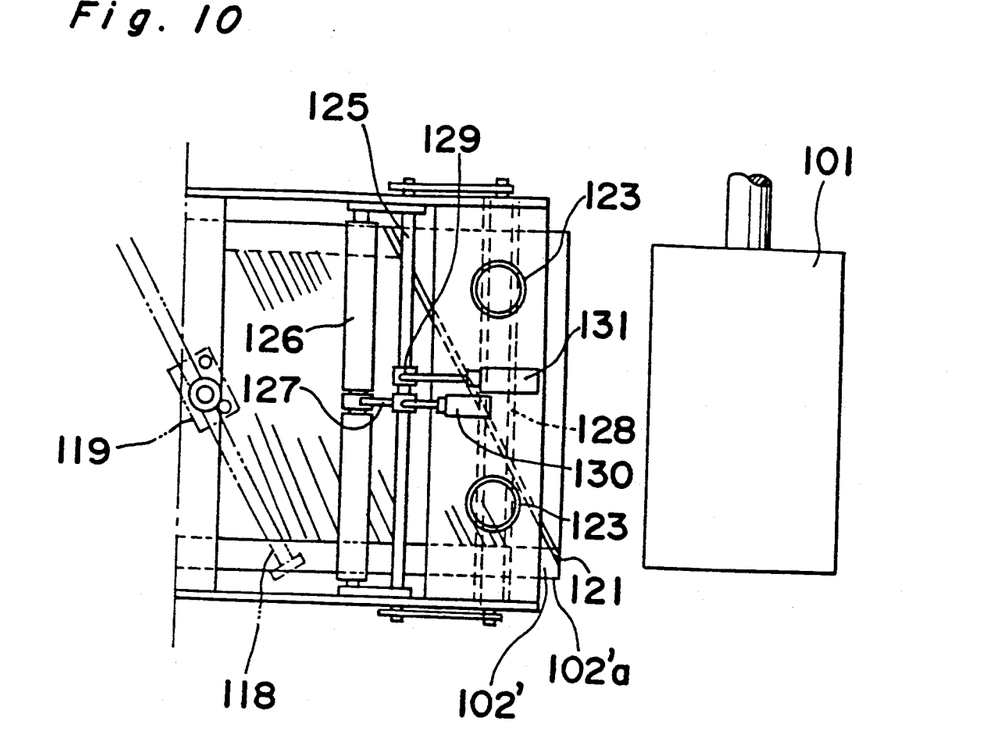
FIG. 10 is a plan view of an apparatus for applying a bias cord ply.
Figure 11:
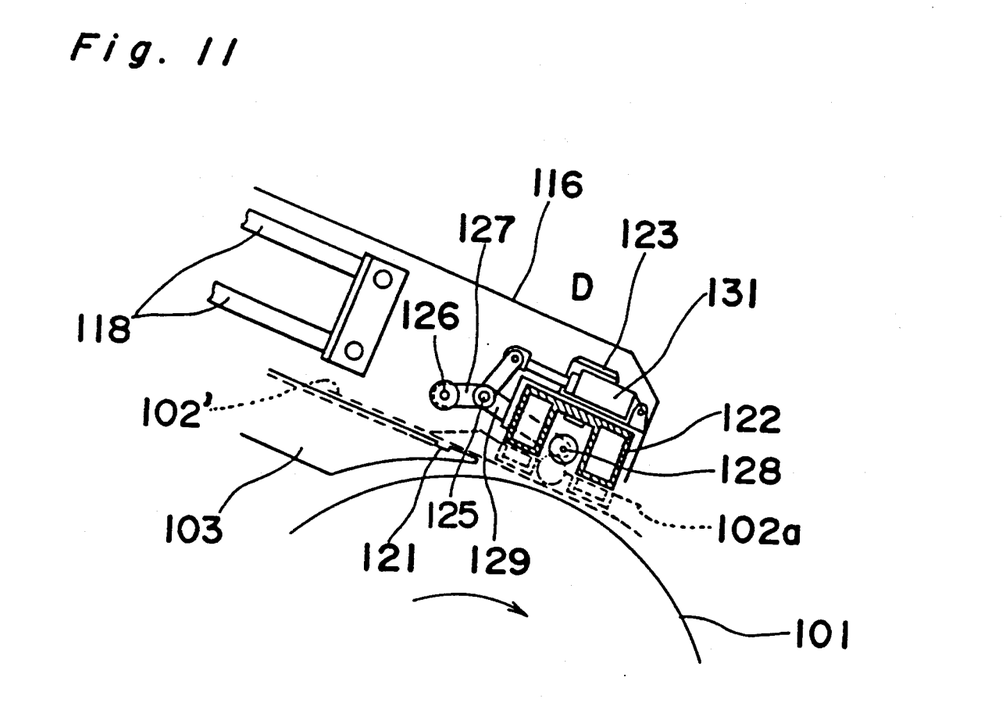
FIG. 11 is a front face view of FIG. 10.

In another embodiment, a depressing roller 126, which is located behind an adsorption box 122 and made of an elastic material such as sponge, rubber or the like may be pivotally supported by an arm 127, on the shaft 125 as shown in FIG. 9 through FIG. 11. A cylinder 130 is coupled to the arm 127, and the depressing roller 126 may be adapted to be oscillated between the pressure-adhering position and the retreat position by the cylinder 130. the succeeding ply 102' to be fed toward the building drum 101 may be depressed by the depressing roller 126 during the rotation of the drum 101.

In the present embodiment, according to the present invention, the table is moved towards the building drum, and the cut leading end of the bias code ply or the radial code ply is adsorbed and retained by the adsorption box of the movable frame, and is drawn out onto the building drum. The cut leading end of the ply is caused to pressure-adhere onto the building drum by the leading-end applying and pressure-adhering roller, while the building drum is caused to rotate at an angle less than one rotation. The ply subjected to the back tension is applied in approximately one circumferential portion and thereafter the ply is cut to major by the cutter mechanism. The building drum is further rotated to join the cut trailing end of the ply with the cut leading end, while the leading-end applying and pressure-adhering roller or the depressing roller is pressure-adhering the cut trailing end of the ply against the building drum. Thus, the variation in the material size due to the shrinkage of the ply is less or the ply is prevented from being creased, since the ply closely adheres against the drum during the application of the ply against the drum. Thus, the proper applying operation is ensured, whereby problems such as meandering and crawling of the belt, improper peripheral speed synchronism of the belt and drum, ply clogging in conveyor division portion, or the like in the conventional system are eliminated, and facilities are rendered more compact and less complicated.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. In a method for applying a strip of tire material onto a building drum including the steps of feeding a leading end of the tire material toward a surface of the building drum, then winding the tire material onto said building drum surface under the rotation of the building drum in one direction, next cutting the tire material in a predetermined length thereof while the tire material is being wound around the building drum, after temporarily stopping the rotation of the building drum, and then completing the winding of the cut tire material around the building drum upon the resumed rotation of the building drum, the improvement comprising the steps of, after feeding the leading end of the tire material toward said surface of the building drum and before winding the material around the building drum with the rotation of the building drum, pressing a predetermined portion of the tire material positioned slightly behind a leading edge of said leading end against the building drum by a roller, which is shifted downwardly from a position above the building drum to contact with and press the tire material on the building drum, and causing said leading end of the tire material with a given length from said predetermined portion to said leading edge to be pressed and applied along the building drum by said roller, which is moved a certain distance around said surface of the building drum toward said leading edge while pressing the tire material onto the building drum.

2. The method as defined in claim 1, wherein the leading end of the tire material to be cut is formed of a triangular shape.

* * * * *